(12) United States Patent
van Roermund et al.

(10) Patent No.: US 9,887,967 B2
(45) Date of Patent: Feb. 6, 2018

(54) PORTABLE SECURITY DEVICE, METHOD FOR SECURING A DATA EXCHANGE AND COMPUTER PROGRAM PRODUCT

(71) Applicant: NXP B.V., Eindhoven (NL)

(72) Inventors: Timotheus Arthur van Roermund, Eindhoven (NL); Jan Rene Brands, Eindhoven (NL); Piotr Polak, Eindhoven (NL)

(73) Assignee: NXP B.V., Eindhoven (NL)

( * ) Notice: Subject to any disclaimer, the term of this patent is extended or adjusted under 35 U.S.C. 154(b) by 68 days.

(21) Appl. No.: 14/613,287

(22) Filed: Feb. 3, 2015

(65) Prior Publication Data

US 2015/0222607 A1    Aug. 6, 2015

(30) Foreign Application Priority Data

Feb. 3, 2014    (EP) .................................... 14153719

(51) Int. Cl.
*G06F 21/00*    (2013.01)
*H04L 29/06*    (2006.01)
(Continued)

(52) U.S. Cl.
CPC .......... *H04L 63/0428* (2013.01); *G06F 21/34* (2013.01); *G06F 21/72* (2013.01);
(Continued)

(58) Field of Classification Search
CPC .......... G06F 21/77; G06F 21/30; G06F 21/86; G06F 21/123; G06F 21/44; G06F 21/445;
(Continued)

(56) References Cited

U.S. PATENT DOCUMENTS 5,623,637 A * 4/1997 Jones .................. G06F 12/1466
710/13
6,859,535 B1 * 2/2005 Tatebayashi ............ G06F 21/10
380/201
(Continued)

FOREIGN PATENT DOCUMENTS

WO    2009/038446 A1    3/2009
WO    2010/103345 A1    9/2010

OTHER PUBLICATIONS

Extended European Search Report for Patent Appln. No. 14153719.1 (dated Jul. 7, 2014).

*Primary Examiner* — Hosuk Song

(57) ABSTRACT

There is disclosed a portable security device for securing a data exchange between a host device and a remote device, said portable security device comprising a processing unit, a secure element and a data interface, wherein: the secure element is arranged to store an encryption key and a decryption key; the processing unit is arranged to control the encryption of data to be transmitted from the host device to the remote device, wherein said encryption is performed using said encryption key; the processing unit is further arranged to control the decryption of data transmitted from the remote device to the host device, wherein said decryption is performed using said decryption key. Furthermore, a corresponding method for securing a data exchange between a host device and a remote device using a portable security device is disclosed, as well as a corresponding computer program product.

15 Claims, 6 Drawing Sheets

(51) Int. Cl.
*G06F 21/34* (2013.01)
*G06F 21/72* (2013.01)
*H04L 9/08* (2006.01)

(52) U.S. Cl.
CPC .......... *H04L 9/0897* (2013.01); *H04L 63/062* (2013.01); *H04L 63/0485* (2013.01)

(58) Field of Classification Search
CPC ... H04L 63/0869; H04L 63/12; G07F 7/1091; G07F 7/12
USPC .................. 726/2–7, 9, 15, 26–30; 713/159, 713/168–169, 185, 189, 192–194
See application file for complete search history.

(56) References Cited

U.S. PATENT DOCUMENTS

| | | | |
|---|---|---|---|
| 7,353,385 B2* | 4/2008 | Nakano | H04L 9/3234 380/282 |
| 7,587,051 B2* | 9/2009 | Bisson | H04L 9/0825 380/281 |
| 8,302,176 B2* | 10/2012 | Huang | G06F 21/34 713/168 |
| 2007/0118891 A1 | 5/2007 | Buer | |
| 2010/0228995 A1 | 9/2010 | Jacobus et al. | |
| 2011/0138192 A1* | 6/2011 | Kocher | G06F 21/602 713/189 |
| 2011/0258333 A1 | 10/2011 | Pomerantz et al. | |
| 2013/0179676 A1 | 7/2013 | Hamid | |
| 2013/0208893 A1 | 8/2013 | Shablygin et al. | |

* cited by examiner

PORTABLE SECURITY DEVICE, METHOD FOR SECURING A DATA EXCHANGE AND COMPUTER PROGRAM PRODUCT

CROSS-REFERENCE TO RELATED APPLICATIONS

This application claims the priority under 35 U.S.C. § 119 of European patent application no. 14153719.1, filed on Feb. 3, 2014, the contents of which are incorporated by reference herein.

FIELD

The present disclosure relates to a portable security device for securing a data exchange between a host device and a remote device. Furthermore, the present disclosure relates to a method for securing a data exchange between a host device and a remote device using a portable security device. Furthermore, the present disclosure relates to a corresponding computer program product.

BACKGROUND

The connectivity of electronic devices plays an important role in modern society. For example, with the advent of so-called cloud services many computational resources which are needed to support, among other, financial transactions, are implemented on a server which is physically inaccessible to users. Furthermore, trends like Bring-Your-Own-Device and Connect-Anywhere-Anytime are clearly visible. Bring-Your-Own-Device refers to the trend that employees are permitted by their employers to bring their own mobile devices to the workplace, and to use those devices to access security-relevant data and applications. Connect-Anywhere-Anytime refers to the trend that users wish to connect their mobile devices at any geographical location and at any moment in time to online services, for example. More and more companies allow the use of private (user-owned) devices for company work and those devices are typically "always connected", whether in the office, at home or on the road. In other words, such private devices typically have a permanent connection, or at least a semi-permanent connection, to a centralized server in the cloud.

In this context, security plays an increasingly important role. More specifically, it is of paramount importance that the data exchange between user-owned devices, such as personal computers, and centralized servers is secure. In other words, the data exchange should be carried out through authenticated and secure communication channels between user-owned devices and centralized servers. In order to achieve this, user-owned devices should among others be able to store cryptographic keys and to perform cryptographic operations. Known solutions are for example smart cards that are used to authenticate users on (company) laptops. Other devices, which are known as security dongles or authentication dongles, offer a similar functionality. However, such devices typically only perform an authentication step. In other words, they usually cannot assist in securing data that is stored on a user-owned device or that is sent over a network to a server. Furthermore, user-owned devices may be infected by malicious software such as a virus, which increases the risk that cryptographic keys stored in these devices are stolen.

Thus, the level of security and the case-of-use which can be achieved by such known devices are still relatively low. Therefore, there still exists a need to securely exchange data, in a user-friendly manner, between user-owned devices and centralized servers of the kind set forth. Similar problems may occur when data are exchanged between user-owned devices and other remote devices, for example peer devices. Thus, in a broader sense, there still exists a need to securely exchange data, in a user-friendly manner, between user-owned devices and remote devices.

SUMMARY

There is disclosed a portable security device for securing a data exchange between a host device and a remote device, said portable security device comprising a processing unit, a secure element and a data interface, wherein: the secure element is arranged to store an encryption key and a decryption key; the processing unit is arranged to control the encryption of data to be transmitted from the host device to the remote device, wherein said encryption is performed using said encryption key; the processing unit is further arranged to control the decryption of data transmitted from the remote device to the host device, wherein said decryption is performed using said decryption key.

According to an illustrative embodiment, the portable security device further comprises a host interface, and the processing unit is arranged to control said encryption and said decryption while the portable security device is connected to the host device via the host interface.

According to a further illustrative embodiment, the processing unit is further arranged to perform the encryption and/or decryption of at least a part of said data.

According to a further illustrative embodiment, the portable security device further comprises at least one cryptographic accelerator which is arranged to perform the encryption and/or decryption of at least a part of said data under control of the processing unit.

According to a further illustrative embodiment, the portable security device further comprises at least one remote device interface, said remote device interface being arranged to facilitate the data exchange between the host device and the remote device. According to a further illustrative embodiment, the processing unit is further arranged to derive secondary keys from the encryption key and the decryption key, and wherein said encryption and decryption are performed using the secondary keys.

According to a further illustrative embodiment, the portable security device further comprises a user authentication unit which is arranged to receive and verify a user credential for unlocking the portable security device.

According to a further illustrative embodiment, the portable security device further comprises a remote device authentication unit which is arranged to perform at least a part of a mutual authentication process between the remote device and the portable security device.

According to a further illustrative embodiment, the portable security device is a portable security dongle.

According to a further illustrative embodiment, a mobile phone is conceived that comprises a portable security device of the kind set forth.

According to a further illustrative embodiment, a data processing system is conceived that comprises a portable security device of the kind set forth, a host device and a remote device.

According to a further illustrative embodiment, the remote device is a Virtual Private Network server or a Voice over Internet Protocol server.

According to a further illustrative embodiment, the host device is a personal computer, a laptop or a tablet.

Furthermore, there is disclosed a method for securing a data exchange between a host device and a remote device using a portable security device, said portable security device comprising a processing unit, a secure element and a data interface, wherein: the secure element stores an encryption key and a decryption key; the processing unit controls the encryption of data to be transmitted from the host device to the remote device, wherein said encryption is performed using said encryption key; the processing unit controls the decryption of data transmitted from the remote device to the host device, wherein said decryption is performed using said decryption key.

Furthermore, there is disclosed a computer program product comprising instructions which, when being executed by a portable security device, carry out steps of a method of the kind set forth.

DESCRIPTION OF DRAWINGS

Embodiments will be described in more detail with reference to the appended drawings, in which.

DESCRIPTION OF EMBODIMENTS

In accordance with the present disclosure, a portable security device is provided which may allow a "pass-through" encryption and decryption in a relatively simple, yet secure way. In order to achieve this, the portable security device may comprise both a processing unit and a secure element. The processing unit may be a conventional central processing unit with sufficient processing power to carry out cryptographic operations. Alternatively, a microcontroller may be used as a processing unit. The processing unit may control the encryption and decryption of data which is exchanged between the host device and the remote device, using cryptographic keys stored in the secure element. The secure element may be implemented as an embedded chip, more specifically as a tamper-resistant integrated circuit with (pre-) installed smart-card-grade applications, for instance payment applications, which have a prescribed functionality and a prescribed level of security. For example, the secure element may be an integrated circuit of the so-called SmartMX™ or SmartMX2™ series of ICs produced by NXP Semiconductors. The portable security device may be embodied as a security dongle, for example.

Compared to conventional authentication dongles and smart cards, the portable security device has more processing power. Optionally, the security dongle may comprise larger memories and multiple interfaces, which support operations on large data sets and direct communication with remote devices, respectively. Thus, the portable security device may be regarded a trustworthy mini-PC that fits in a user's pocket and provides on-the-fly (pass-through) encryption and decryption. As a result, it is more secure: since the encryption and decryption is performed in the portable security device, the cryptographic keys also remain in the portable security device and are not communicated to the host device, nor displayed on a screen. Therefore, it becomes impossible for malware on the host device to steal these credentials. Furthermore, it is not possible for someone to steal the keys by looking over the user's shoulder. Furthermore, the keys are stored in a secure element in the portable security device—at least when the portable security device is unpowered—which also makes cloning hard to impossible, assuming that an attacker does not have access to the portable security device while it is powered and that the user must somehow authenticate to the portable security device in order to enable its functions. Thus, according to an illustrative embodiment, the portable security device comprises a user authentication unit which is arranged to receive and verify a user credential for unlocking the portable security device.

Figure 1:
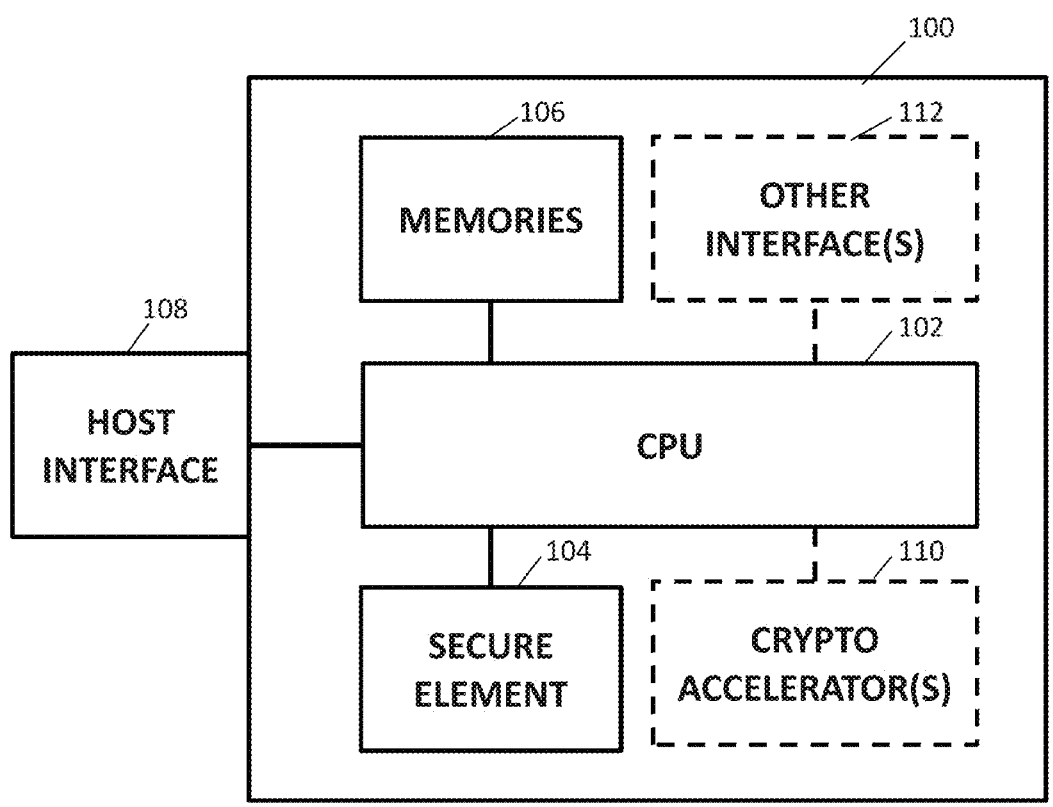
FIG. 1 shows an illustrative embodiment of a portable security device.

FIG. 1 shows an illustrative embodiment of a portable security device. The portable security device 100 may comprises a central processing unit (CPU) 102, a secure element 104 and a host interface 108. The host interface 108 may enable that data can be transmitted between a host device (not shown), e.g. a personal computer, and the portable security device 100. Furthermore, the portable security device 100 may comprise at least one memory 106, at least one other interface 112 and at least one cryptographic (crypto) accelerator 110. The memory or memories 106, other interface(s) 112 and cryptographic accelerator(s) 110 may be regarded as optional components. The host interface 108 and the other interface(s) 112 may be implemented by means of different technologies, such as USB, Ethernet, Wi-Fi®, Bluetooth 4.0, Low-Energy or Near Field Communication (NFC). Applicant-specific client software, such as Virtual Private Network (VPN)) or Voice over Internet Protocol (VoIP) client software, may be installed in the portable security device 100.

In operation, in order to control the encryption of data being transmitted from the host device to the remote device, the central processing unit 102 receives the data from the host device through the host interface 108. Subsequently, the central processing unit 102 may encrypt the data by retrieving the encryption key from the secure element 104 and by encrypting the data with this encryption key. Alternatively, the central processing unit 102 may delegate the task of the actual data encryption to the cryptographic accelerator(s) 110. Subsequently, the central processing unit 102 may transmit the encrypted data back to the host device through the host interface 108, such that the host device may send the encrypted data to the remote device through a network connection, for example. Alternatively, the central processing unit 102 may transmit the encrypted data directly to the remote device through one of the other interfaces 112.

Furthermore, in order to control the decryption of data being transmitted from the remote device to the host device, the central processing unit 102 may receive encrypted data—which has been sent by the remote device to the host device—from the host device through the host interface 108. Alternatively, the central processing unit 102 may receive the encrypted data directly from the remote device through one of the other interfaces 112. Subsequently, the central processing unit 102 may decrypt the data by retrieving the decryption key from the secure element 104 and by decrypting the data with this decryption key. Alternatively, the central processing unit 102 may delegate the task of the actual data decryption to the cryptographic accelerator(s) 110. Subsequently, the central processing unit 102 transmits the decrypted (plaintext) data to the host device through the host interface 108.

As mentioned above, the portable security device 100 may comprise at least one memory 106 as an optional component. As a result, the portable security device 100 is more scalable for different use cases. More specifically, the performance and amount of memory may be adapted to the requirements of the supported applications.

Figure 2:
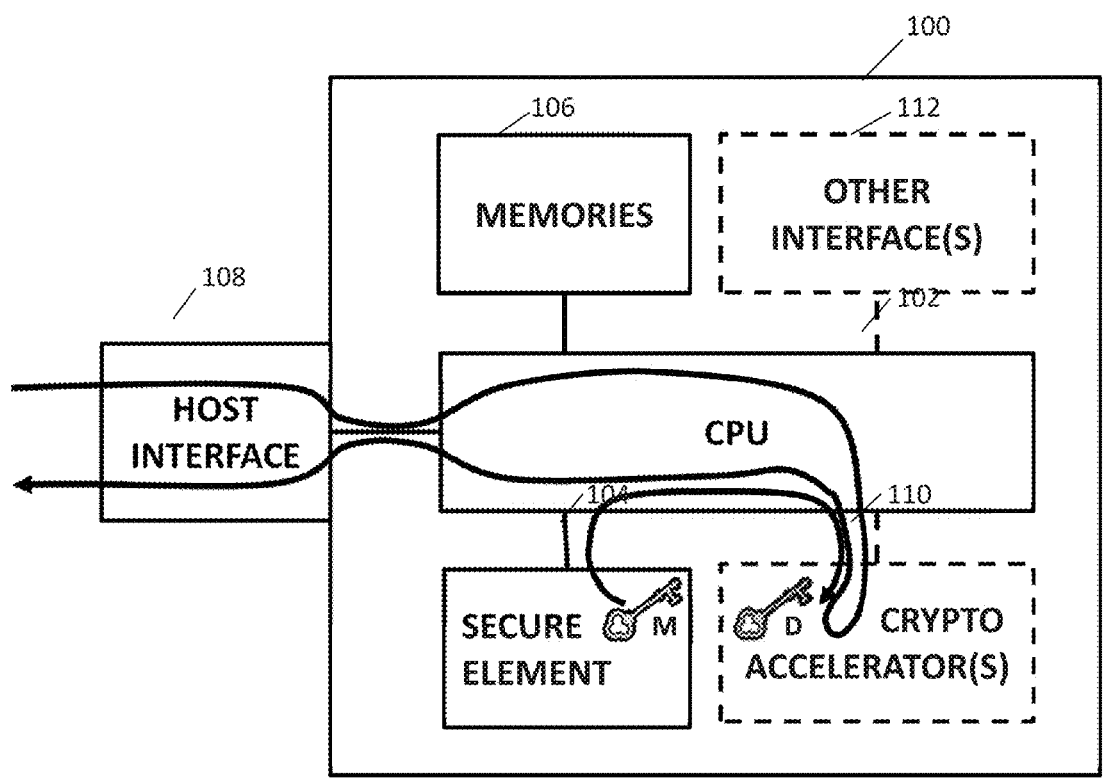
FIG. 2 shows a further illustrative embodiment of a portable security device.

FIG. 2 shows a further illustrative embodiment of a portable security device. In this embodiment, the secure element 104 is arranged to store a master encryption key and a master decryption key. In FIG. 2, both the master encryption key and the master decryption are shown as a single key icon denoted by M. In order to perform the encryption and decryption of data, the central processing unit 102 derives secondary keys from the master encryption key and master decryption key. In FIG. 2, both secondary keys are shown as a single key icon denoted by D. Subsequently, the encryption and decryption are performed using the secondary keys. In the present example, the actual encryption and decryption is performed by the cryptographic accelerator(s) 110, and the central processing unit 102 merely controls the encryption and decryption. This embodiment further increases the security level offered by the portable security device 100.

FIGS. 3A to 3D show steps of an illustrative method for securing a data exchange between a host device and a server using a portable security device. In this example, the remote device may be a server and the host device may act as a client, which is one example of a typical client-server scenario. However, the portable security device may equally well be used to advantage if the remote device is a peer device, for example.

Figure 3A:
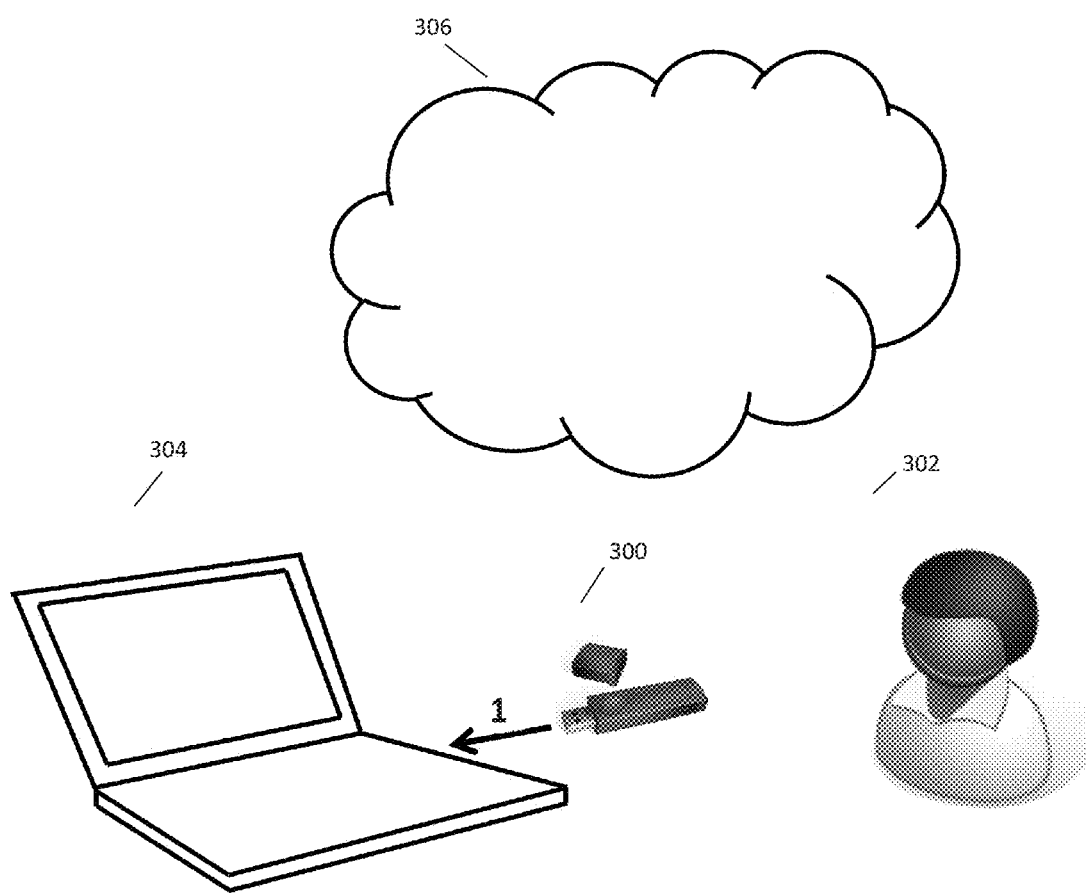
FIGS. 3A to 3D show steps of an illustrative method for securing a data exchange between a host device and a server using a portable security device.

In a step 1 shown in FIG. 3A, a user 302 inserts the portable security device 300, for example a USB-enabled security dongle, into a host device 304, for example a laptop.

Figure 3B:
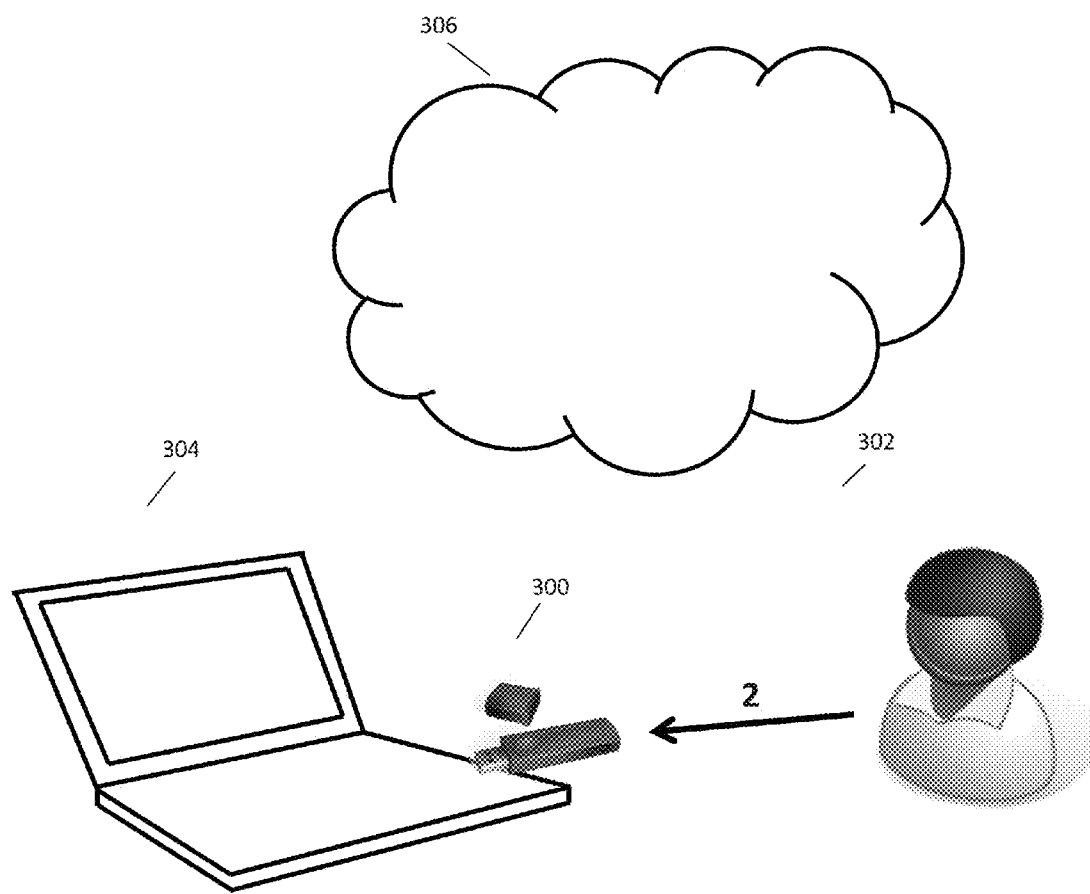

Optionally, in a further step 2 shown in FIG. 3B, the user 302, authenticates himself or herself to the portable security device 300. This is known as 2-factor authentication, as also implemented for bank cards (that is, something you have the card and something you know—the secret PIN code). Thereby, it may be prevented that someone who steals the portable security device 300, can use it. The user authentication may comprise a simple password-based authentication via a user interface of the host device 304, but also more sophisticated authentication mechanisms may be used. Furthermore, the authentication does not have to take place on the host device 304, but the portable security device 300 itself may for example have a small keypad allowing the user to type in a PIN code, or a smart phone (not shown) might be used to authenticate via an optional NFC interface.

Figure 3C:
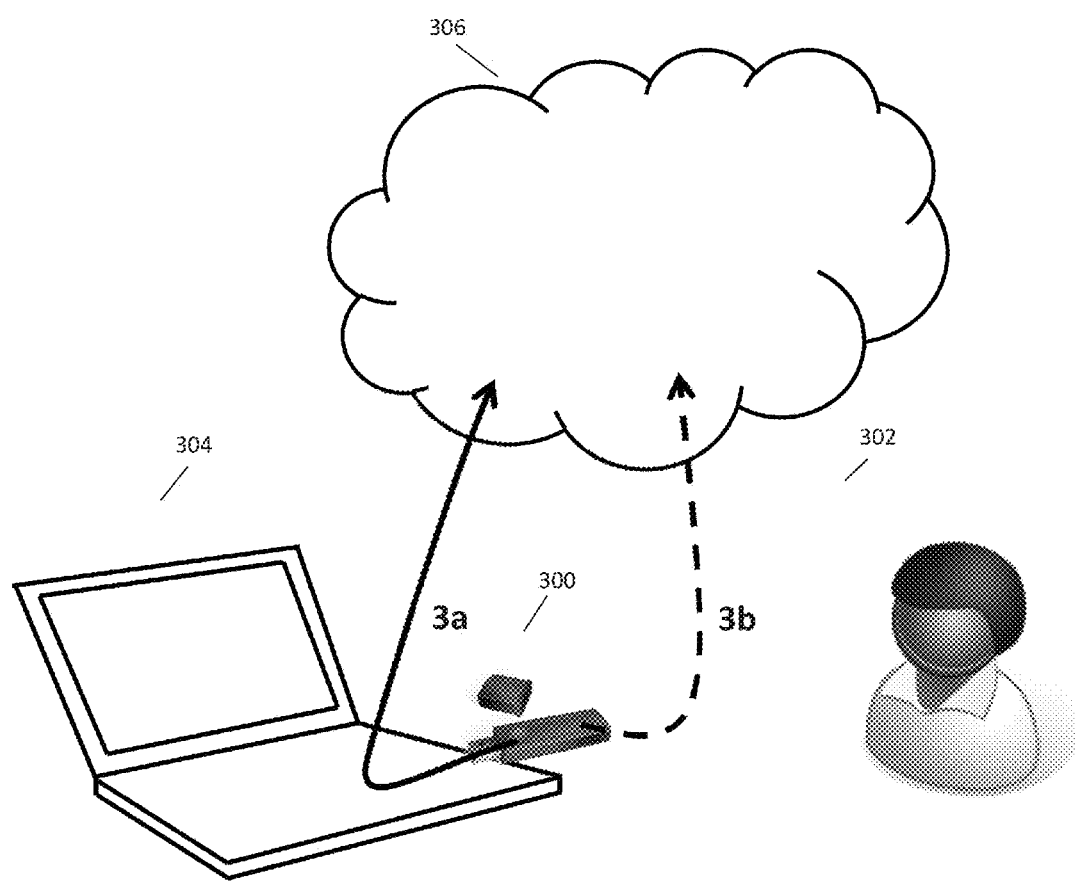

In a further step 3a, 3b shown in FIG. 3C, a mutual authentication process may be performed between the server 306 and the portable security device 300, possibly followed the creation of an encryption key (also called a session key) for the encryption of the data to be transmitted. For example, in case of a VPN, during setup of a VPN channel, an authentication step may be performed between the VPN client device (in this case, the portable security device 300) and the VPN server. After a successful authentication, a session key is established. The encryption and decryption of the data over the VPN channel is subsequently performed using this newly established (and fresh) session key. The authentication from the portable security device 300 to the resource (i.e. the server 306) that is accessed, may be implemented in various ways, e.g. using a challenge/response procedure or a Fast IDentity Online (FIDO) procedure. When connecting to the server 306, the portable security device 300 may "borrow" network connections from the host device (arrow 3a) or use its own (e.g. Wi-Fi) connection if available (arrow 3b).

Figure 3D:
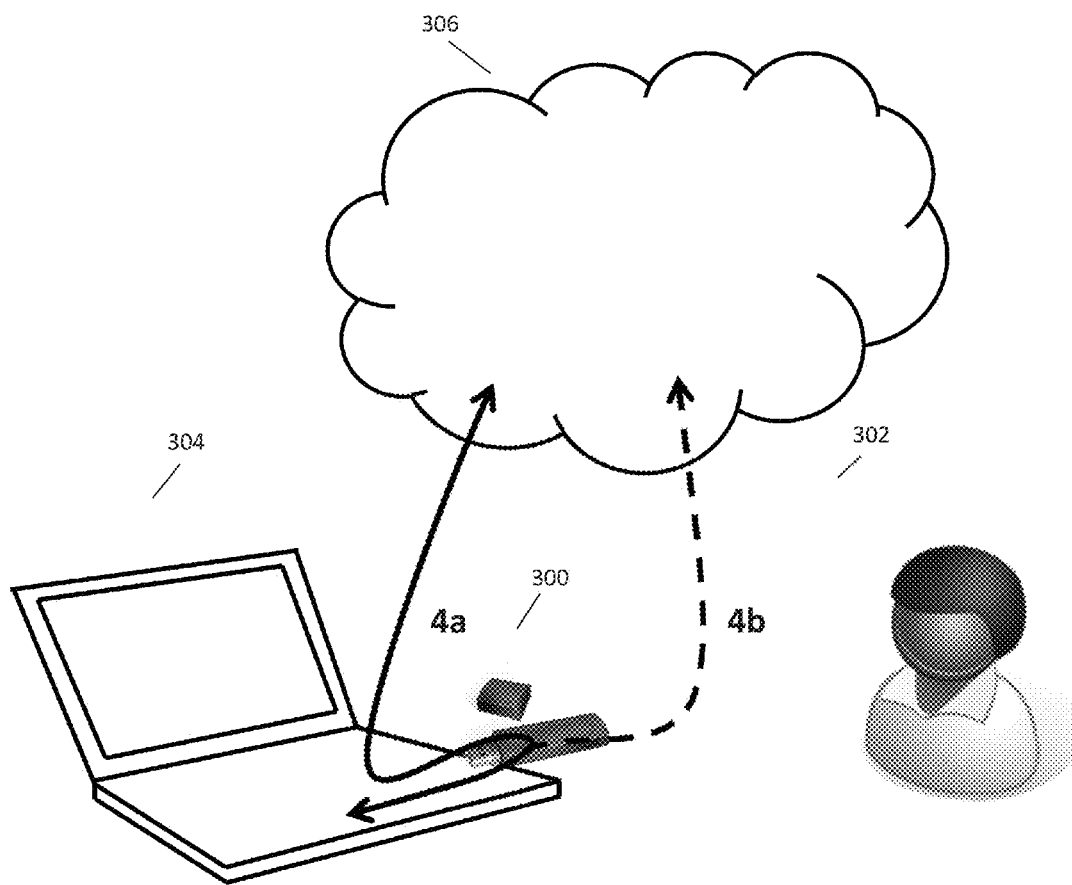

In a further step 4a, 4b shown in FIG. 3D, the portable security device 300 may perform on-the-fly data encryption and decryption. Again, the portable security device 300 may either borrow the host device's network connection (arrow 4a) or use its own network connection if available (arrow 4b). Subsequently, when the dongle is removed, the connections may be terminated and/or stored data may become instantly inaccessible (since data can no longer be encrypted or decrypted).

It is noted that the (secure) communication between the portable security device 300 and the remote server 306 in steps 3a, 3b and 4a, 4b may either be tunneled via the host device 304, or via another (optional) interface of the portable security device 300. The latter could for example be an Ethernet or Wi-Fi® network adaptor that is directly connected to a network.

The scenario above sketches how the portable security device can be used to setup a secure connection to a remote service, Examples of such services may be a VPN server, a node of a The Onion Router (TOR) network or a VoIP (such as Skype™) server. For some applications, additional software may need to be installed on the host device, e.g. to route all interact traffic via the newly setup VPN connection, or in case of (TrueCrypt-like) storage encryption, to use the portable security device for encryption or decryption of these data. The portable security device may conveniently be integrated in a mobile phone, where the phone offers tethering/hotspot functionality for other devices. Furthermore, the skilled person will appreciate that the presently disclosed portable security device may not only be used to advantage in the above-described client-server scenario, but also in, for example, peer-to-peer scenarios. In that case, the host device does not exchange data with a server, but with another remote device, i.e. a peer device.

It is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 portable security device
102 central processing unit 104 secure element
106 memories
108 host interface
110 cryptographic accelerator(s)
112 other interface(s)
300 portable security device
302 user
304 host device
306 server

The invention claimed is:

1. A portable security device for securing a data exchange between a host device and a remote device, said portable security device comprising a processing unit and a secure element, wherein:
   the secure element is arranged to store an encryption key and a decryption key;
   the processing unit is arranged to control the encryption of data to be transmitted from the host device to the remote device, wherein said encryption is performed using said encryption key, and
   the processing unit is further arranged to control the decryption of data transmitted from the remote device to the host device, wherein said decryption is performed using said decryption key, wherein
   the encryption of data and the decryption of data is performed on the portable security device.

2. A portable security device as claimed in claim 1, further comprising a host interface, wherein the processing unit is arranged to control said encryption and said decryption while the portable security device is connected to the host device via the host interface.

3. A portable security device as claimed in claim 1, wherein the processing unit is further arranged to perform the encryption and/or decryption of at least a part of said data.

4. A portable security device as claimed in claim 1, further comprising at least one cryptographic accelerator which is arranged to perform the encryption and/or decryption of at least a part of said data under control of the processing unit.

5. A portable security device as claimed in claim 1, further comprising at least one remote device interface, said remote device interface being arranged to facilitate the data exchange between the host device and the remote device.

6. A portable security device for securing a data exchange between a host device and a remote device, said portable security device comprising a processing unit and a secure element, wherein:
   the secure element is arranged to store an encryption key and a decryption key;
   the processing unit is arranged to control the encryption of data to be transmitted from the host device to the remote device, wherein said encryption is performed using said encryption key;
   the processing unit is further arranged to control the decryption of data transmitted from the remote device to the host device, wherein
   said decryption is performed using said decryption key,
   the processing unit is further arranged to derive secondary keys from the encryption key and the decryption key, and
   said encryption and decryption are performed using the secondary keys.

7. A portable security device as claimed in claim 1, further comprising a user authentication unit which is arranged to receive and verify a user credential for unlocking the portable security device.

8. A portable security device as claimed in claim 1, further comprising a remote device authentication unit which is arranged to perform at least a part of a mutual authentication process between the remote device and the portable security device.

9. A portable security device as claimed in claim 1, being a portable security dongle.

10. A mobile phone comprising a portable security device as claimed in claim 1.

11. A data processing system comprising a portable security device as claimed in claim 1, a host device and a remote device.

12. A data processing system as claimed in claim 11, wherein the remote device is a Virtual Private Network server or a Voice over Internet Protocol server.

13. A data processing system as claimed in claim 11, wherein the host device is a personal computer, a laptop or a tablet.

14. A method for securing a data exchange between a host device and a remote device using a portable security device, said portable security device comprising a processing unit and a secure element, wherein:
   the secure element stores an encryption key and a decryption key;
   the processing unit controls the encryption of data to be transmitted from the host device to the remote device, wherein said encryption is performed using said encryption key, and
   the processing unit controls the decryption of data transmitted from the remote device to the host device, wherein said decryption is performed using said decryption key, wherein
   the encryption of data and the decryption of data is performed on the portable security device.

15. A computer program product comprising instructions which, when being executed by a portable security device, carry out steps of a method as claimed in claim 14.

* * * * *